Jan. 17, 1928.

K. A. ENZ 1,656,185

VALVE

Filed Dec. 20, 1924

4 Sheets-Sheet 1

Inventor
Karl A. Enz.
By Brockett, Hyde & Milburn
Attorneys

Jan. 17, 1928.

K. A. ENZ

VALVE

Filed Dec. 20, 1924

1,656,185

4 Sheets-Sheet 3

Inventor
Karl A. Enz.

By Brockett Hyde + Milburn
Attorneys

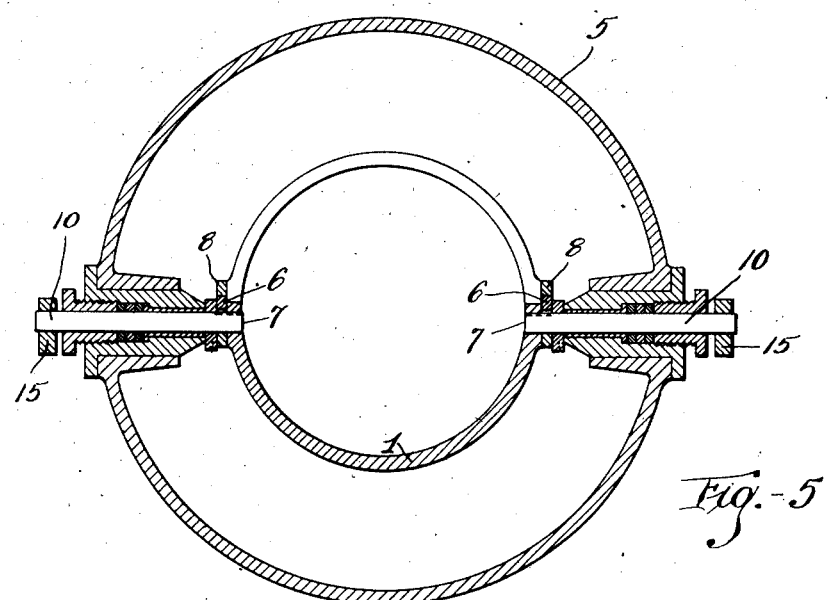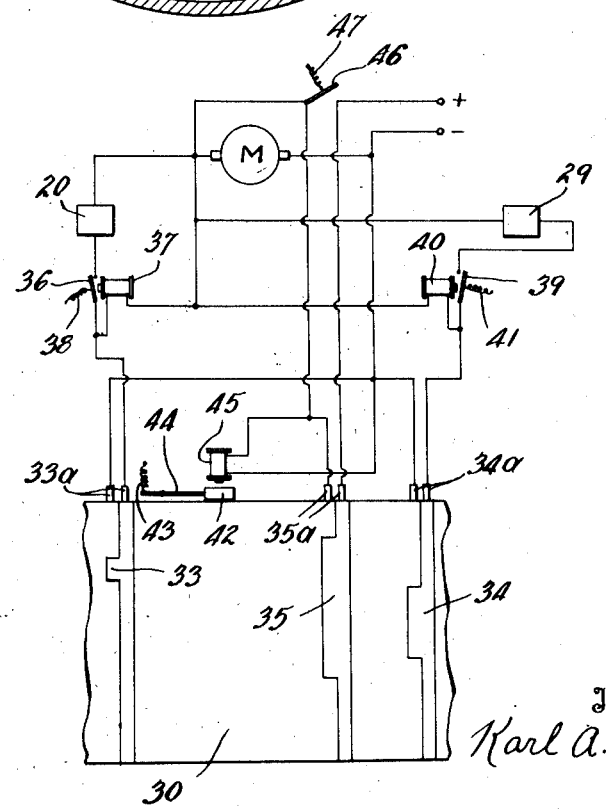

Patented Jan. 17, 1928.

1,656,185

UNITED STATES PATENT OFFICE.

KARL A. ENZ, OF CLEVELAND, OHIO.

VALVE.

Application filed December 20, 1924. Serial No. 757,217.

This invention relates to improvements in valve structures and operating mechanism therefor, for controlling the flow of any fluid, as for instance water, steam, or gases, and is especially adapted for use in connection with the water-way of a hydraulic turbine or irrigating system. This application is a companion of other applications which are being filed by the same applicant of even date herewith.

The objects of the present invention are to provide such a valve structure which is leak-proof and capable of being easily operated and which at the same time does not reduce the section or area of the water-way or other fluid conduit, as it is swung into fully open position; also to provide such a device which is substantially free from danger of accident which might otherwise be caused to the mechanism by lodging of solid material between the valve itself and the walls of the fluid conduit.

Another object of the present particular form of device is to provide electrical means for controlling the opening and closing movements of the valve, although mechanical means may be employed for performing the same operations.

More specifically, the present invention consists in a disc or valve and valve seat therefor provided with inter-engaging portions of corresponding form and in which the valve itself is adapted to be unseated or seated by movements in a direction substantially normal to the general plane of the valve seat and which is adapted to be swung into and out of registry or alignment with the seat. That is to say, in performing the opening operation of the valve, it is first unseated by a distinct movement along a substantially straight line in a direction away from the valve seat and then swung bodily about a center into fully open position, this swinging movement being distinct from the straight line movement; to close the valve, it is first swung into registry with the valve opening preliminary to the seating movement which is then performed so as to move the valve in a straight line substantially normal to the general plane of the valve opening.

Other objects of the present invention will appear from the following description and claims when considered together with the drawings.

Figures 1, 2:
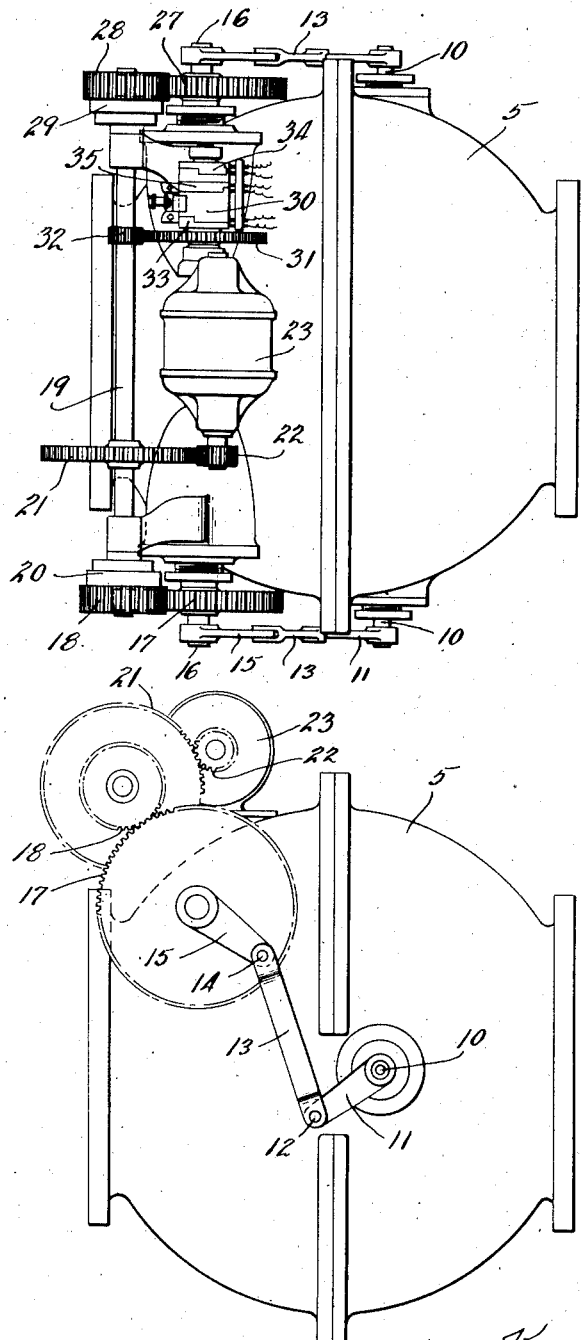
Figure 3:
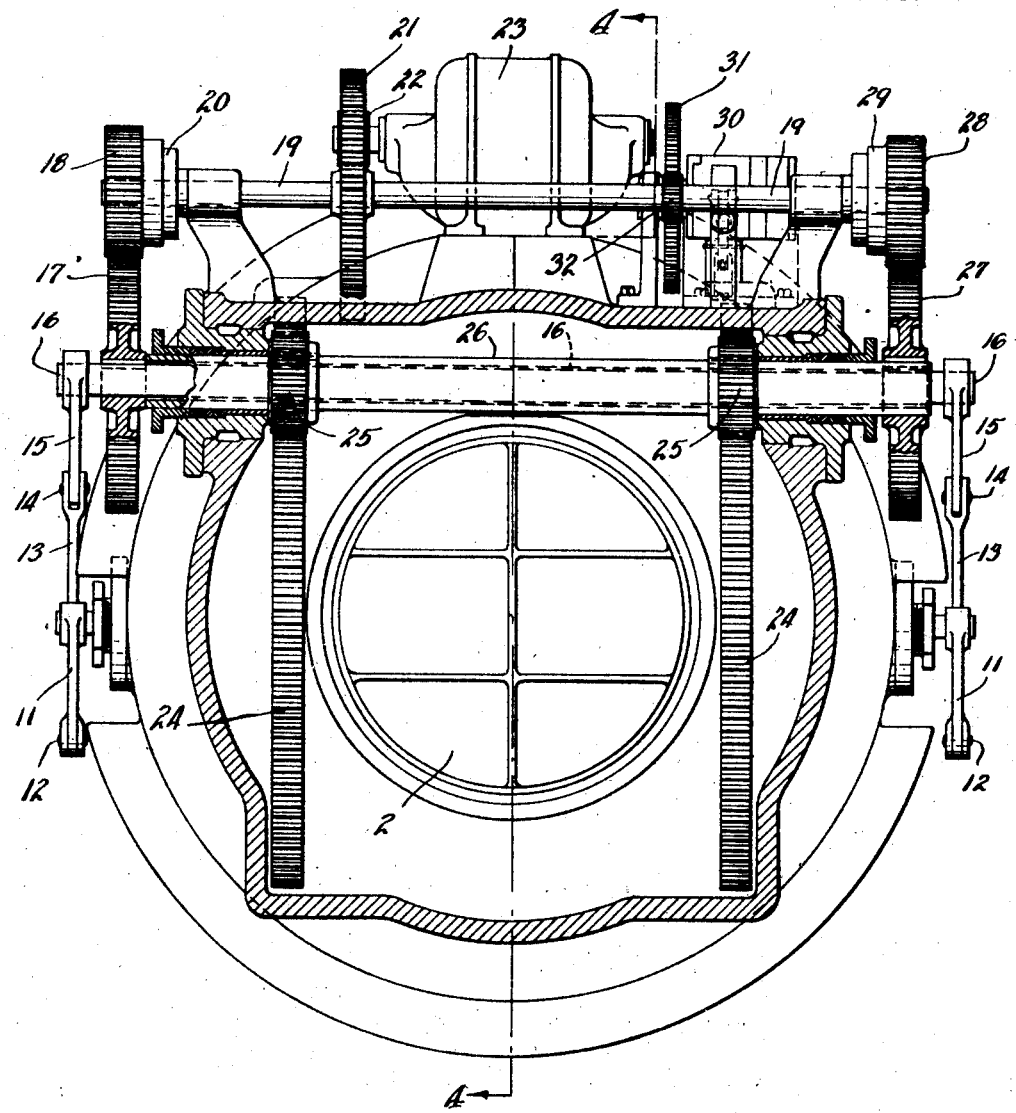
Figure 4:
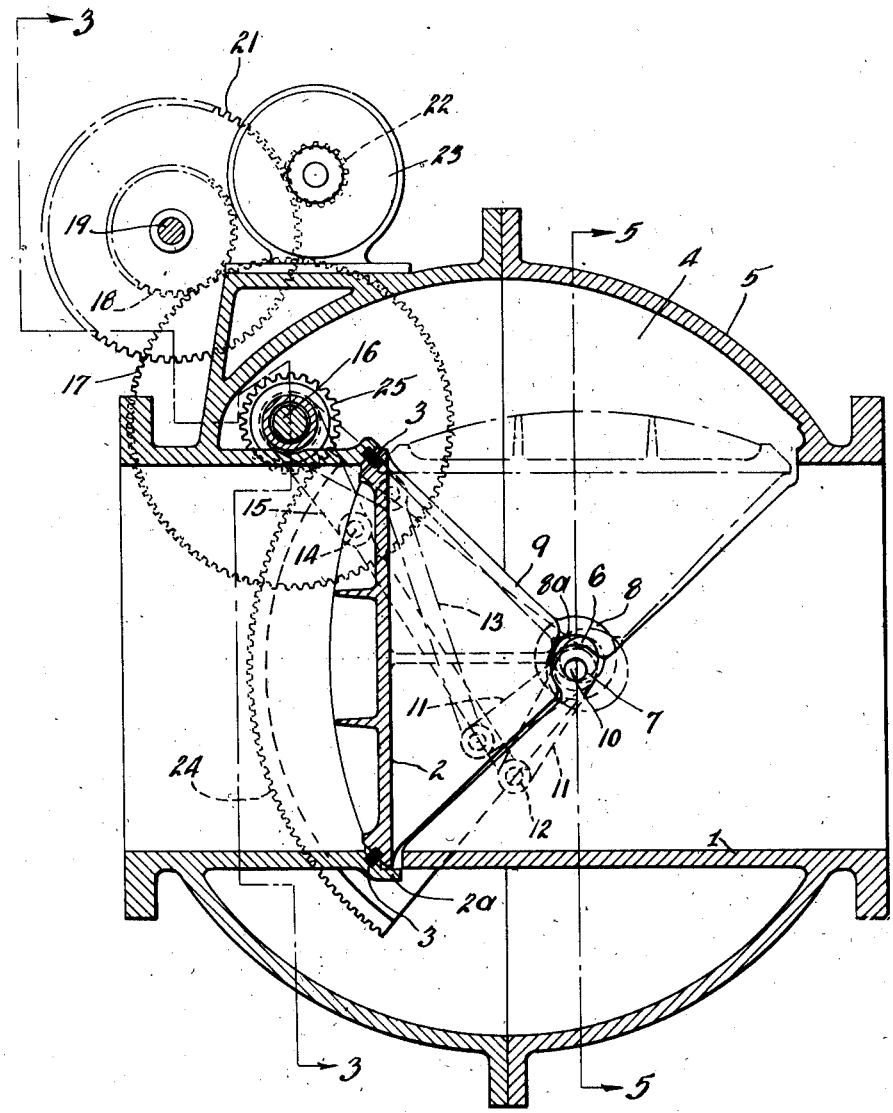

Fig. 1 is a plan view of my improved device. Fig. 2 shows the same in elevation; Fig. 3 is a sectional view taken on line 3—3, Fig. 4; Fig. 4 is a sectional view taken on line 4—4, Fig. 3; Fig. 5 is a sectional view taken on line 5—5, Fig. 4; and Fig. 6 is a diagrammatical view of the electric control system.

The tubular portion 1 forms part of the water-way or other fluid conduit leading to the turbine and is provided with a valve seat which is here shown as being of substantially spherical form and which is adapted to be engaged by the marginal portion of the disc or valve 2 for effectively closing the opening. The marginal seat portion of the valve is of course of the form or shape corresponding to that of the valve seat and suitable sealing gaskets 3 may be provided; so that a substantial leak-proof closure may be effected. The tubular portion 1 has an opening through one side thereof, as clearly indicated in Figs. 4 and 5 such opening communicating with the chamber 4 which is enclosed by the casing 5 and which surrounds the tubular portion 1.

The means for moving the valve along a straight line so as to seat or unseat the same, as above briefly explained, comprises an eccentric 6 which is adapted to operate about the point 7 for engagement and actuation of the strap or stirrup 8 surrounding the same. Such a combination of eccentric and strap or stirrup is provided for actuation of each of the two side members 9 which extend from the valve or gate 2. The eccentrics 6 are fixedly mounted upon the stub shafts 10 so as to be operated thereby, such shafts being suitably mounted in the walls of the casing 5 and the tubular portion 1. The eccentric 6 in each case is operated by the crank arm 11 which is secured at the outer end of the stub shaft 10 and the other end of which has pivotal connection 12 with one end of the connecting rod or link 13. The other end of the rod 13 has pivotal connection at the point 14 with the crank arm 15 which in turn is fixedly mounted on the inner shaft 16. The shaft 16 is adapted to be operated by means of the gear 17 mounted thereupon, this gear meshing with and being driven by the gear 18 which in turn is adapted for operation by the shaft 19 through the magnetic clutch 20. The shaft 19 is driven by the gear 21 mounted thereon, this last named gear being driven by the pinion 22 which is mounted upon the rotor of the reversible electric motor 23. So that upon operation of the motor 23 and through the several connections just now described, that is when the magnetic clutch 20 is energized, the eccentric 6 will be actuated so as to cause seating or unseating movement of the valve 2 in a direction substantially normal to the general plane of the valve opening, according to whether the motor 23 is operated in one direction or the other. That is to say, the motor 23 is operated in one direction and the parts driven thereby are likewise actuated in the corresponding direction to unseat the valve, whereas the seating operation of the valve is effected by operation of the motor 23 in the opposite direction.

The means for effecting the swinging movement of the valve so as to move the same into and out of registry and alignment with the valve opening comprises the racks 24 which are provided upon the wings or sides 9 of the valve, these racks being of segmental or sector shape, as clearly indicated in Fig. 4, and being adapted to be operated by the meshing pinions 25 which are fixed upon the outer hollow shaft 26. The sides of the gate or valve and the rack portions provided thereon together with the meshing pinions 25 are all arranged within the chamber 4, that is between the tubular portion 1 and the outer casing 5 so as not to obstruct the flow of water through the tubular part of the water-way or other fluid conduit. The hollow shaft 26 surrounds the inner shaft 16 and is operated independently of the shaft 16 and is adapted to be driven by the gear 27 fixed thereon, which in turn is driven by the meshing gear 28. Through the connection of a magnetic clutch 29 power is transmitted from the shaft 19, which is the same shaft upon which the other magnetic clutch 18 already referred to is mounted. These two magnetic clutches 18 and 29 are however energized independently and at different times, as will be more fully explained, so as to perform the seating or unseating and closing or opening of the valve as separate and distinct movements. So that upon energization of the magnetic clutch 29, the motor will cause actuation of the parts just now described so as to effect swinging movement of the valve for opening or closing the same, according to the direction in which the motor is operated.

It is to be understood that during the swinging movement of the valve, as just now explained, the straps or stirrups 8 which are fixed thereto since they form part of the side members 9, are rotated about the center 8ª which represents the true center of the stirrup or strap 8. With this arrangement it is possible to actuate the eccentrics so as to unseat the valve, for instance, and then upon stopping such unseating operation the stirrup or strap can be rotated about the center 8ª without disturbing the position of the eccentrics. Then upon closing the valve, the strap or stirrup 8 can be swung back so as to bring the valve into alignment with the valve opening and thereby return the strap or stirrup 8 to the same relative position with respect to the eccentric 7 as they occupied upon completion of the unseating operation. The parts are then in proper relation for actuation of the eccentrics for the purpose of seating the valve. It is to be further understood that upon completion of the seating operation the eccentrics 6 will remain in the position to which they have then been brought, by virtue of the friction between the gears and other parts, so that there will be no overrunning of the eccentrics and no danger of the eccentrics being accidentally disturbed by the swinging operation which then follows. A seating portion 2ª may be provided so as to serve as a stop for the valve for the purpose of limiting the swinging movement of the valve as it is returned to position in alignment with the valve opening.

The electric system for controlling the several operations above referred to, so as to effect and preserve the proper sequence of the same, will be readily understood from the diagram in Fig. 6. Before referring to the electric diagram, mention should be made of the control or contact drum 30 which is mounted upon the shaft of the gear 31 which in turn is driven by the meshing pinion 32, the last named pinion being fixed upon the shaft 19. Upon the drum 30, which is shown in Fig. 6, in developed or projected form, there are provided the contacts 33 for controlling the seating and unseating operations, the contact 34 for controlling the swinging movement of the valve, and the contact 35 for automatically stopping the motor upon completion of either the opening or closing operation of the valve. These several contacts are provided with co-operating brushes 33ª, 34ª, and 35ª respectively, which are arranged in the circuits of the control system, as clearly shown in Fig. 6. The circuit through the magnetic clutch 20 is controlled by the switch 36 which is adapted to be closed by the electro-magnet 37, that is upon completion of the circuit through the contact portion 33. The switch 36 is normally opened by the spring 38 except when held closed by the magnet 37. Likewise the electro-magnetic clutch 29 is energized when the switch 39 is closed so as to complete the circuit therethrough, such circuit being completed only when the contact 34 co-operates with the brushes 34ª which close the circuit at this point. The switch 39 is adapted to be closed by means of electro-magnet 40 and, except when so closed, this switch is held open by means of spring 41. The contact portions 33 and 34 are so arranged with respect to each other that immediately upon breaking of the circuit through the contact 33, further rotation of the drum 30 will cause the contact 34 to close the circuit corresponding thereto; so that immediately upon completion of the unseating operation of the valve, the swinging movement of the valve is automatically and immediately initiated.

The motor is permitted to run so long as the main line circuit is closed through the brushes 35$^a$ and the corresponding contact portion 35, it being noted that this contact portion is so arranged with respect to the other contact portions 33 and 34 that the effective part of the contact 35 begins slightly before that of the contact 33 and continues until slightly after the breaking of the circuit through contact 34. With this arrangement the motor is actually operated only for a period slightly longer than the combined period corresponding to the seating and unseating and swinging movements of the valve. That is to say, the motor is set into operation just immediately prior to the closing of the circuit through the first magnetic clutch 20 and the other is automatically stopped upon de-energization of the second magnetic clutch 29, that is during the opening operation of the valve; and likewise upon closing the valve, the motor is set into operation just immediately prior to the swinging movement of the valve and is automatically stopped immediately after breaking of the circuit corresponding to the contact portion 33, or in other words as soon as the valve has been effectively seated. As a means of preventing coasting or over-running of the drum 30 upon cutting out motor in the manner just now described, I have provided a brake 42 for engagement with the drum 30, this brake being automatically and normally applied to the drum by means of spring 43 which engages one end of the lever arm 44 upon which the brake shoe 42 is mounted. Release of the brake is effected by means of electric magnet 45 which is included in the motor circuit so that the brake is held in release position to permit free operation of the drum 30 during all the time that the motor is in operation. Upon the motor being automatically stopped however, in the manner just now described, the circuit through the magnet 45 is automatically applied to the drum 30 so as to immediately stop the same. It will be understood that the several contacts 33, 34 and 35 extend only part way around the circumference of the drum 30 which is rotated in one direction for performing the opening operation of the valve, and in the opposite direction for performing the closing of the valve. In order to set the motor into operation in the first instance and to thereby render effective the contact 35 for holding the circuit closed through the motor during the opening and closing operation of the valve, I have provided the switch 46 which is adapted to be momentarily held closed by the operator until the drum 30 is rotated sufficiently by the motor to render the contact 35 effective. Then upon release of the momentary switch 46, which is automatically held open by the spring 47, the motor will be held in circuit and the operations will be performed according to the automatically controlled sequence as already explained. The switch 46 will be used, of course, for the initiation of both the opening and closing operations.

Briefly, the entire operation of the present improved device is as follows: The main line circuit is closed through the motor so as to run in the proper direction according to whether the valve is to be opened or closed, and then upon momentarily closing the switch 46 the drum 30 will be rotated so as to close the holding main line circuit for the motor through the contact portion 35 and the brushes 35$^a$. At the same time the magnet 45 is energized so as to hold the brake in released position. Almost immediately upon completing the motor circuit through the contact portion 35, the contact portion 33 is brought into engagement with the brushes 33$^a$ so as to complete the circuit through the magnet 37 and thereby close the switch 36 which completes the circuit through the electro-magnet 20. The inner shaft 16 is thereupon rotated through the several connections already described and the valve is unseated by actuation of the eccentrics. Completion of this unseating operation is followed automatically and practically immediately by closing of the circuit through the contact portion 34, the inner shaft 16 being stopped and held in inactive position through the friction of the parts upon automatically cutting out of the electro-magnetic clutch 20. Closing of the circuit through the brushes 34$^a$ and contact 34 renders the electromagnet 40 active so as to close the switch 39 and maintain the same closed so as to energize the magnetic clutch 29 so long as the contact portion 34 is effective. Closing of the clutch 29 causes operation of the outer shaft 26 which through the several connections already described is effective to produce the swinging or opening movement of the valve. When the valve has been swung to fully open position the circuit through the contact portion 35 is automatically opened by continued rotation of the drum 30, and almost immediately thereafter the circuit is also automatically broken through the contact portion 35 and brushes 35$^a$, so as to stop the motor and automatically apply the brake. Then in order to close the valve, the reverse operations are followed. Upon starting the motor in the proper direction for performing the closing operation and upon closing the momentary switch 46 for a brief interval of time the drum 30 will be rotated in the opposite direction so as to perform the several operations just now recited in the reverse order— the valve being swung into position in alignment with the valve opening by energization of the clutch 29 which is then automatically de-energized, immediately after which the valve is effectively seated by energization of the magnetic clutch 20 which is in turn automatically de-energized upon completion of the seating operation. The motor is then automatically cut out and the brake automatically applied.

It is to be understood that the form of fluid conduit and valve might be varied according to the spirit of my invention and that other means might be devised for performing the operations comprehended by my invention.

Having described my invention, I claim:

1. In a valve structure, a casing having a chamber and a conduit portion extending therethrough, the conduit having an opening into the chamber and a circumferential valve seat adjacent the opening, a valve having a face adapted to cooperate with said seat to close the passage through said conduit, and a face substantially similar to that of the section of said conduit cut away to form said opening, said valve being mounted in said casing for swinging movement between a position in alignment with said seat and a position in said opening, and being provided with a toothed segmental member in said chamber, a pinion engaging said member and rotatable to effect said swinging movement of said valve, means without said conduit for moving said valve in said aligned position thereof longitudinally of said conduit to seat or unseat the same.

2. In a valve structure, a casing having a chamber and a conduit portion extending therethrough, the conduit having an opening into the chamber and a circumferential valve seat adjacent the opening, a valve having a face adapted to cooperate with said seat to close the passage through said conduit, and a face substantially similar to that of the section of said conduit cut away to form said opening, said valve being mounted on bearings in said casing outside said conduit for swinging movement between a position in alignment with said seat and a position in said opening, and being provided with a toothed segmental member in said chamber, a pinion engaging said member and rotatable to effect said swinging valve movement, means for moving said bearings longitudinally of said conduit, to seat or unseat said valve, said means comprising eccentric mountings for said bearings in angular arrangement such that the meshing relation between said segmental member and said pinion is not materially altered by said valve seating movement.

3. In a valve structure, a casing having a chamber and a conduit portion extending therethrough, the conduit having an opening into the chamber and a circumferential valve seat adjacent the opening, a valve having a face adapted to cooperate with said seat to close the passage through said conduit, and a face substantially similar to that of the section of said conduit cut away to form said opening, said valve being mounted on bearings in said casing outside said conduit for swinging movement between a position in alignment with said seat and a position in said opening, and being provided with a toothed segmental member in said chamber, a pinion engaging said member and rotatable to effect said swinging valve movement, said pinion being secured upon a hollow shaft mounted in said casing, eccentric mountings for said bearings adapted for angular movement to seat or unseat said valve by movement longitudinal of said conduit in said aligned position of the valve, said mountings being in such angular arrangement that the meshing relation between said segmental member and said pinion is not materially altered by said valve seating movement, a solid shaft extending within said hollow shaft, connections between said solid shaft and said eccentric mountings for actuating the latter by movement of the former, an actuating member on said casing, and means for automatically connecting said actuating member with said shafts in timed relation to unseat and swing said valve to clear said conduit, or to align said valve with said seat and seat the same.

In testimony whereof I hereby affix my signature.

KARL A. ENZ.